United States Patent [19]

Nakata et al.

[11] 4,395,119
[45] Jul. 26, 1983

[54] METHOD FOR AUTOMATIC, NON-DESTRUCTIVE MEASUREMENT OF ECCENTRICITY OF COATED ELECTRODES

[75] Inventors: Kazuo Nakata, Fujisawa; Akihiko Iochi, Odawara; Isamu Kaise, Fujisawa; Kazuo Takeuchi; Katsuhiko Nomura, both of Kamakura, all of Japan

[73] Assignee: Kobe Steel, Limited, Kobe, Japan

[21] Appl. No.: 202,240

[22] Filed: Oct. 30, 1980

[30] Foreign Application Priority Data

Nov. 8, 1979 [JP] Japan ............................. 54-144996

[51] Int. Cl.³ .................. G01N 21/88; G01B 11/02
[52] U.S. Cl. .................................. 356/73; 250/560; 356/237; 356/385
[58] Field of Search ............... 356/73, 73.1, 375, 381, 356/384, 385, 386, 237; 250/560, 561

[56] References Cited

U.S. PATENT DOCUMENTS

| | | | |
|---|---|---|---|
| 3,604,940 | 9/1971 | Matthews | 250/560 |
| 3,806,253 | 4/1974 | Denton | 250/560 X |
| 3,856,411 | 12/1974 | Zanoni . | |
| 3,870,890 | 3/1975 | Binks et al. . | |
| 3,897,156 | 7/1975 | Chasson . | |
| 3,922,094 | 11/1975 | Colding et al. . | |
| 3,947,129 | 3/1976 | Wiklund | 356/385 |
| 4,037,103 | 7/1977 | Ryden, Jr. . | |
| 4,063,820 | 12/1977 | Borgese . | |
| 4,074,938 | 2/1978 | Taylor . | |
| 4,097,849 | 6/1978 | Taylor . | |
| 4,115,702 | 9/1978 | Nopper . | |
| 4,124,728 | 11/1978 | Marcuse et al. | 356/73.1 X |

OTHER PUBLICATIONS

"Using a Laser Micrometer for Precision Control of Wire Diameter and Position of a CV Line", Taylor, Proceedings of the 13th, 23rd, International Wire and Cable Symposium, Atlantic City, N.J. USA (3-5 Dec. 1974), pp. 326-329.

Primary Examiner—Vincent P. McGraw
Attorney, Agent, or Firm—Oblon, Fisher, Spivak, McClelland & Maier

[57] ABSTRACT

Disclosed is a method for the automatic, nondestructive, measurement of the eccentricity of a core wire in a coating composition coated upon an electrode, the measurement being formed by at least two sets of optical means, each including a light source and a line sensor. One of the optical sensors is positioned to measure the diameter of a coated portion of the core wire while at least one of the remaining sensors is positioned to measure the diameter of an uncoated portion. The positions and diameters of both portions are compared to find the eccentricity of the core wire. Where three sensors are used to measure the position and thickness of the exposed wire portion, the eccentricity of a misaligned or bent rod can be determined.

8 Claims, 24 Drawing Figures

METHOD FOR AUTOMATIC, NON-DESTRUCTIVE MEASUREMENT OF ECCENTRICITY OF COATED ELECTRODES

BACKGROUND OF THE INVENTION

1. Field of the Invention

This invention relates to a method for automatically measuring the eccentricity of core wires of welding rods.

2. Description of the Prior Art

As shown in FIG. 1, welding rods consist of a cylindrical metallic core wire 1 and a coating composition (flux) 2 covering the circumference of the metallic core wire with as high a concentricity as possible.

In the manufacturing process of welding rods of this sort, the core wires are more or less eccentric with the outer periphery of the flux. The eccentricity e is prescribed by Japanese Industrial Standards to be $$\frac{(a+d)-(b+d)}{b+d} \times 100 = \frac{a-b}{b+d} \times 100 \leq 3(\%)$$

As shown in FIG. 1, the various symbols in the foregoing formulas represents
a: Maximum thickness of coating
b: Minimum thickness of coating
d: Core wire diameter
D: Coating diameter
a−b: Variation in coating thickness
a−b/2: Eccentric deviation As for the standard for controlling the degree of eccentricity, for example, the variation in wall thickness (eccentric deviation), (a−b) can be expressed by a function of the eccentricity e, the diameter d of the core wire 1 and the diameter D of the flux 2 according to the foregoing formula, as follows.

$$(a-b) = \frac{e}{2+e}(D+d) \quad (1)$$

Thus, the quality of welding rods can be controlled by measuring the value of (a−b).

On the other hand, these sorts of welding rods are produced at an extremely high speed, for instance, at a speed of 1,500 rods/min, so that it has been difficult to measure the eccentricity of individual rods automatically. The current procedure of quality control is intended to measure the eccentricity by sampling inspection during or after the manufacturing process.

However, in the production of welding rods. The eccentricity and the direction of eccentric deviation of extruded welding rods are not uniform and in some cases vary from one to another even in an arbitrary number of consecutive rods of a population. Therefore, in order to maintian high quality in the welding rods, it is desirable to increase the sampling number or to inspect all of the produced welding rods, notwithstanding the various problems which are encountered in the conventional methods of eccentricity inspection as will be stated hereinabove.

The known methods concerning the measurement of eccentric deviation or variations in the coating thickness of welding rods are classified into methods using a microscope and methods using an electromagnetic eccentric meter. The former resort to a destructive inspection which is troublesome and destroys the sampled welding rods even if they are of passable quality. Therefore, this method is by no means applicable to total inspection and, even in a sampling inspection, invites a reduction of the yield of the products.

In the latter methods, a sample welding rod is gripped at arbitrary positions by a pair of measuring heads which are provided between two mounting tables, and the sample rod is rotated by hand while checking for variations in the coating thickness by contrast with variations in the difference of impedence between the two detecting heads. This method depends on manual operation and thus cannot be used for automatic inspection nor for welding rods having core wires of non-magnetic material nor of flux containing ferromagnetic powder.

SUMMARY OF THE INVENTION

Thus, the present invention aims at the elimination of the above-mentioned problems and has as an object the provision of an automatic non-destructive measuring method for the inspection of the eccentricity of core wires of welding rods, detecting by optical means the flux portion and the core wire of the welding rod or grip portion.

It is another object of the present invention to provide a method suitable for application to the inspection of all welding rods for checking the eccentricity of the individual rods during the manufacturing process thereof.

It is a further object of the present invention to provide a method capable of measuring the eccentricity of core wires of welding rods with high precision even when the rods are in askew positions or in bent state.

DETAILED DESCRIPTION OF THE PREFERRED EMBODIMENT

The invention is hereafter described more particularly by way of preferred embodiments shown in the accompanying drawings.

First Embodiment

Figure 1:
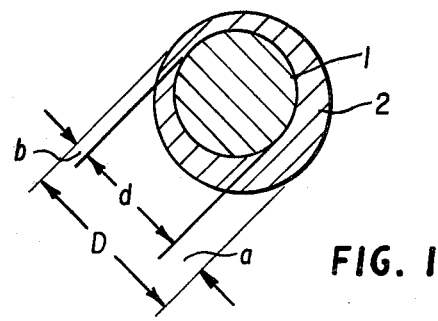
FIG. 1 is a sectional view of a welding rod.
Figure 2:
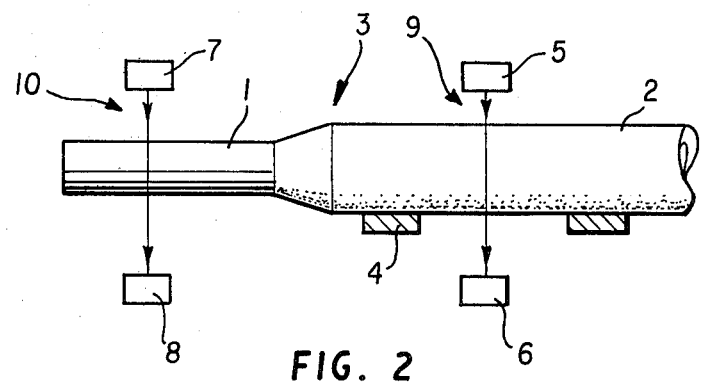
FIG. 2 is a front view showing a first embodiment of the present invention.
Figure 3:
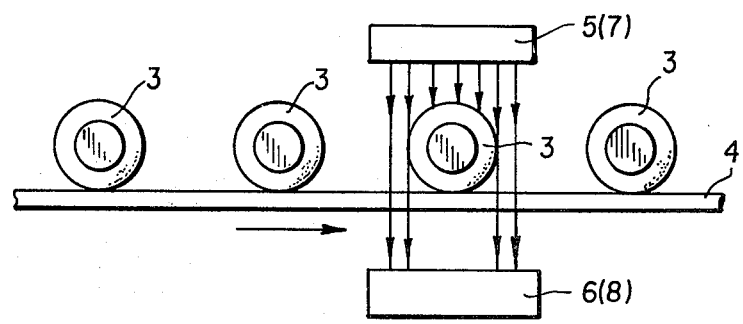
FIG. 3 is a side view of a second embodiment.

As shown in FIGS. 2 and 3, a plural number of welding rods 3 are transferred in a predetermined direction and at a constant speed by a conveyer 4, each welding rod having flux 2 coated on the circumference of a core wire 1 as uniformly as possible and with as high a concentricity as possible.

In this instance, the welding rods 3 which are successively placed on the conveyer basically have their respective axes disposed perpendicular to the direction of travel.

At suitable positions on opposite sides of the passage of the conveyer 4, there are provided a light source 5 for projecting a light beam toward the flux 2 of the welding rod 3 and a photosensitive device 6 for generating signals in response to light from the light source 5, along with another pair of a light source 7 and a photosensitive device 8 which are positioned on opposite sides of the passage of the welding rod and across from a grip portion, that is, the core wire 1 of the welding rod 3.

The first detector 9 which consists of the light source 5 and the photosensitive device 6, and the second detector 10 which consists of the light source 7 and the photosensitive device 8, are aligned in a direction perpendicular to the travel direction of the conveyer 4.

The light sources 5 and 7 are each adapted to project a band-like beam of light having a width slightly greater than the diameter of the welding rod 3, while the photosensitive devices which receive the band-like beam are each constituted by an image line sensor or the like.

Figure 4:
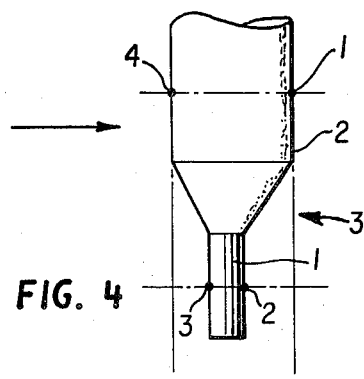
FIG. 4 is a view showing the relation between the welding rod and detectors in the embodiment of FIG. 2.
Figure 6:
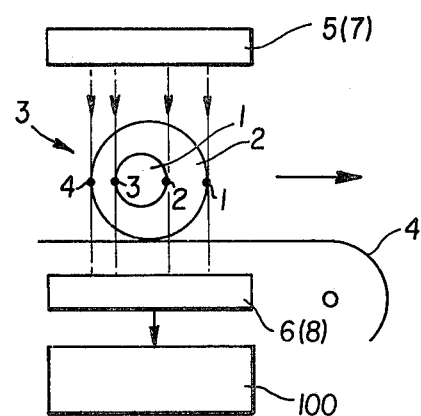
FIG. 6 is a diagram showing the projected light beam in the first embodiment.

With the foregoing arrangement, as soon as one welding rod 3 enters the view field of the photosensitive device 6, the light beam from the light source 5 is intercepted by the flux 2 of the welding rod 3, the photosensitive device 6 producing an output corresponding to the flux portion as shown in FIGS. 4 and 6.

On the other hand, as the light beam from the light source 7 is intercepted by the grip portion 2 of the welding rod 3, the photosensitive device 8 produces an output corresponding to the grip portion 1.

Figure 5:
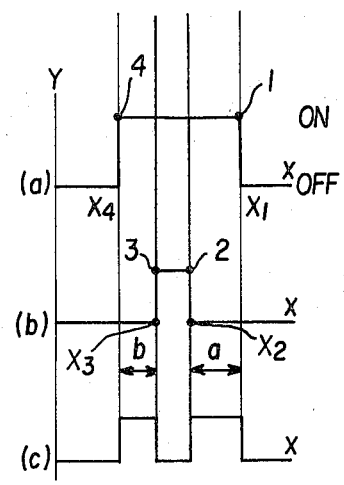
FIG. 5 is a view explanatory of the operation of the first embodiment corresponding to the welding rod of FIG. 4.

FIG. 5 shows a graphical representation of the outputs of photosensitive devices 6 and 8. The Y axis represents signal strength while the X axis corresponds to the length of the sensor or the signal time. The top line indicates the reading of the sensor 6 having an on width (1)-(4) corresponding to the width of the flux portion. The middle line indicates the output of sensor 8 while the bottom line represents the difference between the two, resulting in the values of a and b.

Therefore, the perpendicular distance a between the cut off points (1) and (2) in the outputs of the photosensitive devices 6 and 8 correspond to the distance between the right-hand side line (1) of the flux and the right-hand side line (2) of the grip portion of the welding rod 3 (FIG. 5), while the distance b between the cut off or edge points (3) and (4) corresponds to the distance between the left-hand side line (3) of the grip portion 1 and the left-hand side line (4) of the flux 2 of the welding rod 3.

Further, the width of the output of the photosensitive device 8 corresponds to the diameter of the core wire 1.

Thus, the variation in coating thickness (a−b) of formula (1) can be calculated from the output signals from the respective photosensitive devices 6 and 8. The arithmetic operations for this purpose are performed automatically by a computer 100 which is connected to the detectors 9 and 10.

Second Embodiment

Figure 7:
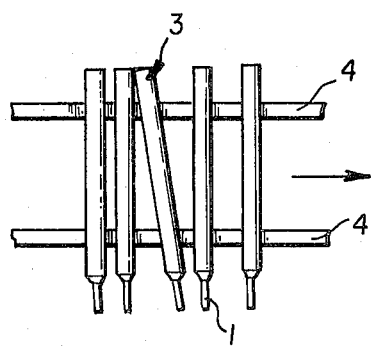
FIG. 7 is a plan view of a welding rod being transferred in an obliquely disposed state.
Figure 8:
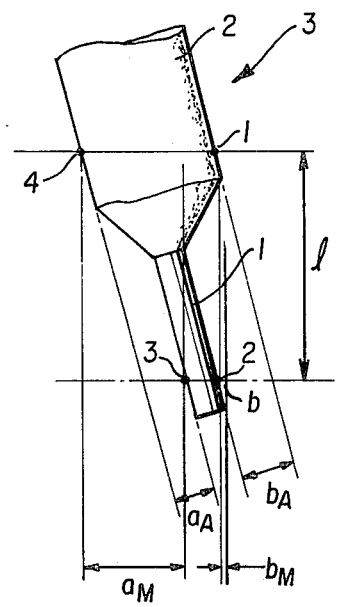
FIG. 8 is a diagram showing an obliquely disposed welding rod as occurring in the first embodiment.

In the method the first embodiment, it becomes difficult to measure the true values of variations in the coating thickness when the welding rod 3 is disposed obliquely on the conveyer, the measurement resulting in values $a_M$ and $b_M$ in contrast to the true values $a_A$ and $b_A$ as shown in FIGS. 7 and 8.

Figure 9:
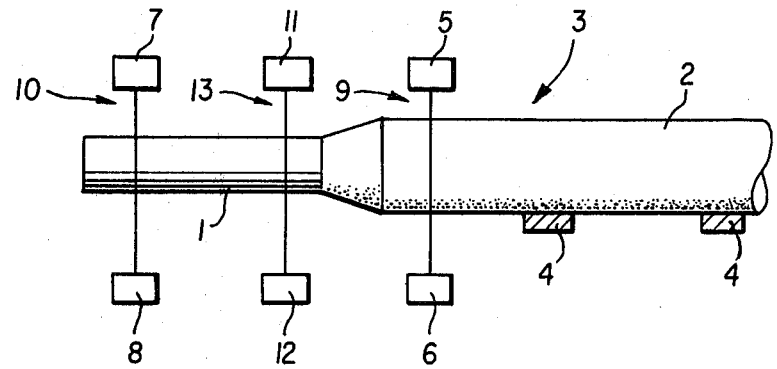
FIG. 9 is a diagram of a second embodiment of the present invention.

FIG. 9 illustrates an embodiment which overcomes this problem, wherein a third detector 13 similar to detectors 9 and 10 and having a light source 11 and a photosensitive device 12 is provided at an intermediate position between the first and second detectors 9 and 10 for detecting the grip portion 1 of the welding rod 3.

In this embodiment, the detectors 9, 13 and 10 are equidistantly spaced from each other by $l_{AB}$ and $l_{BC}$.

Figure 11:
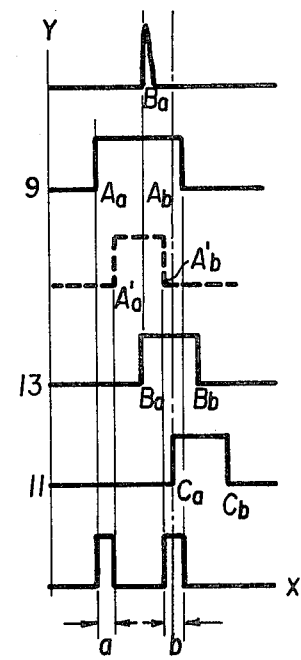

With the foregoing arrangement, of the output signals of the detectors 9, 11 and 13 which are read out in synchronism with the detection of the front side $B_a$ of the core wire 1 by the third detector 13, the output signal of the first detector 9 has a width indicative of the location and width $A_a - A_b$ of the flux 2, the output signal of the second detector 10 has a width indicative of the location of the side edge and the width of the core wire 1, and the output signal of the third detector has a width indicative of the location and width $B_a - B_b$ of the core wire 1 in the intermediate position, as seen in FIG. 11 where the X axis is sensor length or signal time and the Y axis is signal strength.

Figure 10:
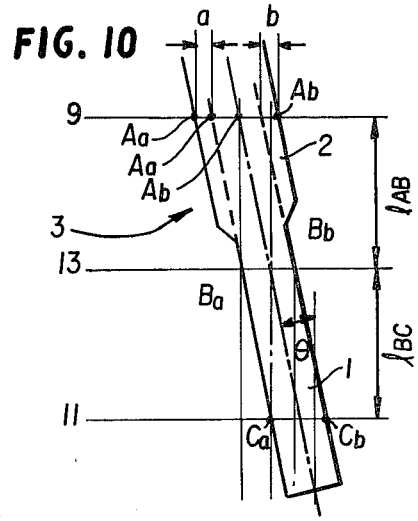
FIGS. 10 to 12 are diagrams explanatory of the operations of the second embodiment.

In this instance, as clear from FIG. 10, the variation in the flux thickness (a−b) is $$|a - b| = |(A'_a - A_a) - (A_b - A'_b)|$$

in which $A_a'$ and $A_b'$ are locations of the side edges of the core wire at the position of the first detector 9, that is, the phanthom lines of FIG. 11.

On the other hand, since the location along the X axis is:

$$A'_a = 2B_a - C_a$$
$$A'_b = 2B_b - C_b$$

the variation in the flux thickness $|a-b|$ expressed by $$|a - b| = |(2B_a - C_a - A_a) - (A_b 2B_b + C_b)| \quad (2)$$

Thus, according to Equation (2), the difference in flux thickness $|a-b|$ is obtained from the edges, or cut off points $A_a$, $A_b$, $B_a$, $B_b$, $C_a$ and $C_b$ in the output signals of the respective detectors 9, 11 and 13.

In the foregoing embodiment based on three-point measurement, it is possible to measure the difference in flux thickness with a small error, if any, even if the welding rod is in a bent state.

Figure 12:
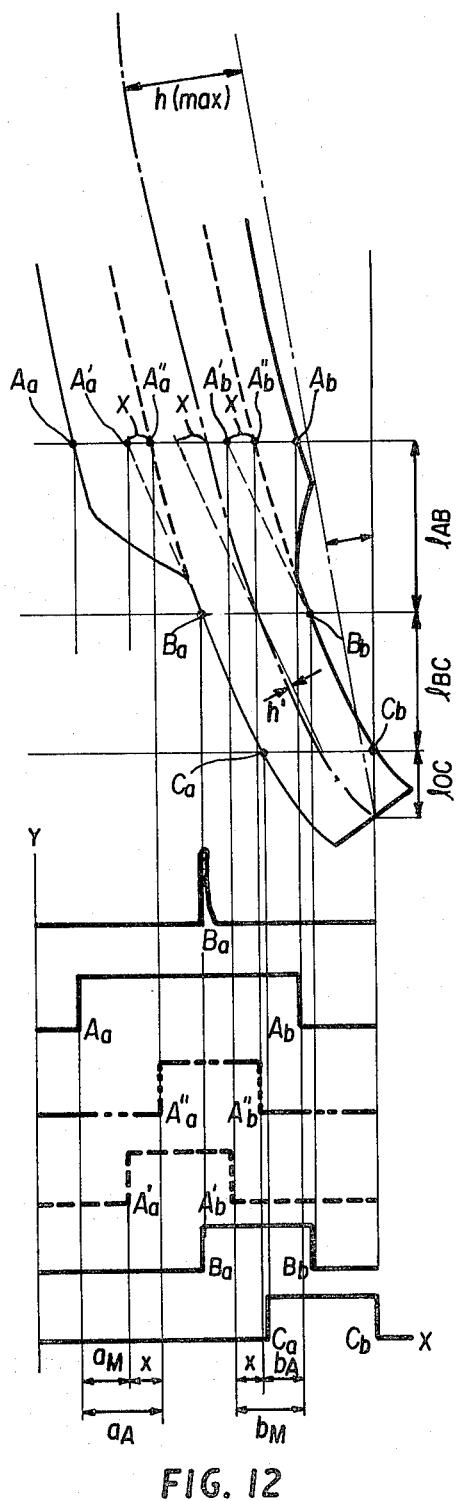

Namely, referring to FIG. 12, $a_M - b_M$ = measured value of difference in thickness
$a_A - b_A$ = true value of difference in thickness On the other hand, if there is a difference x between the actual position $A_a''$ of the core wire and the position $A_a$ to be assumed by a straight core wire, $$a_M = a_A - x$$
$$b_M = b_A + x$$
$$\therefore a_M - b_M = (a_A - x) - (b_A + x)$$
$$= (a_A - b_A) - 2x$$

Thus, the error in the measured value of the differnce in flux thickness due to a bend of the welding rod can be held less than $2 \times$.

For example, in a case where the rod length is 400 mm and the maximum bend is hmax=0.5 mm, $$2x = \frac{4h' \cdot l_{AB}}{l_{BC}} = 8.4 \times 10^{-5mm}$$

so that no problems occur in actual applications.

Although the three detectors are spaced from each other by the same distance, $l_{AB} = l_{BC}$, the distance between the respective detectors may be varied arbitrarily if desired and the intermediate detector 13 may be adapted to detect the flux portion of the welding rod.

In a case where $l_{AB} = l_{BC}$, the value of $A_a'$ is corrected by $$\frac{l_{AC}}{l_{BC}} \cdot (Ca - Ba).$$

Third Embodiment

Figure 13:
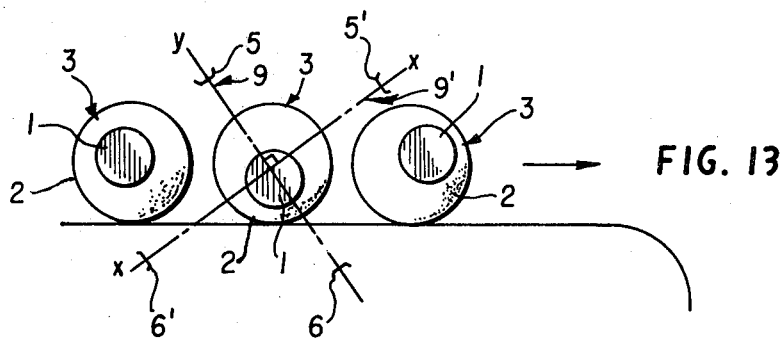
FIG. 13 is a diagram of a third embodiment of the invention.

FIG. 13 illustrates another embodiment which is provided with additional detectors 9' which are provided in positions shifted 90 degrees along the circumference of the welding rod 3 from the detectors 9 and 10 of the first embodiment or from the detectors 9, 10 and 13 of the second embodiment, each additional detector similarly having a light source 5' (11', 7') and a photosensitive device 9' (10', 13').

In this arrangement, if the eccentricity detected by the detectors 9, 10 and 13 aligned along the direction of the y-axis (detector 13 is absent in the first embodiment) is $e_y$, the eccentricity detected by the detectors 9', 10' and 13' (detector 13' is absent in the first embodiment) is $e_x$, and the actual maximum eccentricity is e, $$e = \sqrt{e_x^2 + e_y^2}$$

$$e_x = \frac{|a_x - b_x|}{2}$$

$$e_y = \frac{a_y - b_y}{2}$$

$$\therefore e = \sqrt{|a_x - b_x|^2 + |a_y - b_y|^2}$$

On the other hand, since $e = \frac{a-b}{2}$ $$|a - b| = \sqrt{|a_x - b_x|^2 + |a_y - b_y|^2} \quad (3)$$

In this manner, the difference in flux thickness is measured at two positions shifted from one another by 90° and the measured values are synthesized according to Equation (3) to obtain the correct value of the difference in flux thickness or of the eccentricity no matter in which direction the difference in flux thickness exists.

Fourth Embodiment

Figure 14:
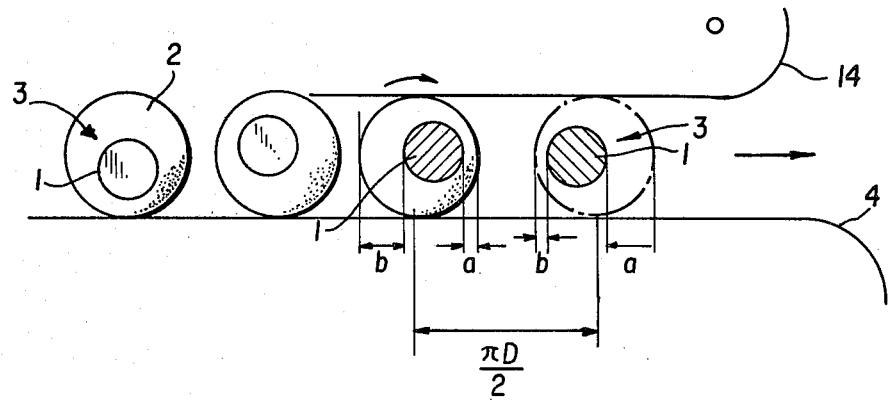
FIG. 14 is a diagram of a fourth embodiment of the present invention.

FIG. 14 illustrates another embodiment in which the welding rod as in the first and second embodiments is rotated while the difference in thickness a−b is measured for n-times during a half revolution of the welding rod to obtain the peak value of the difference.

The welding rod is rotated, for example, by a belt 14 which is circulated over the conveyer 4 in contact with each welding rod 3. The centers of adjoining rods are separated by $\pi D/2$

First Example of a Detector

Figure 15:
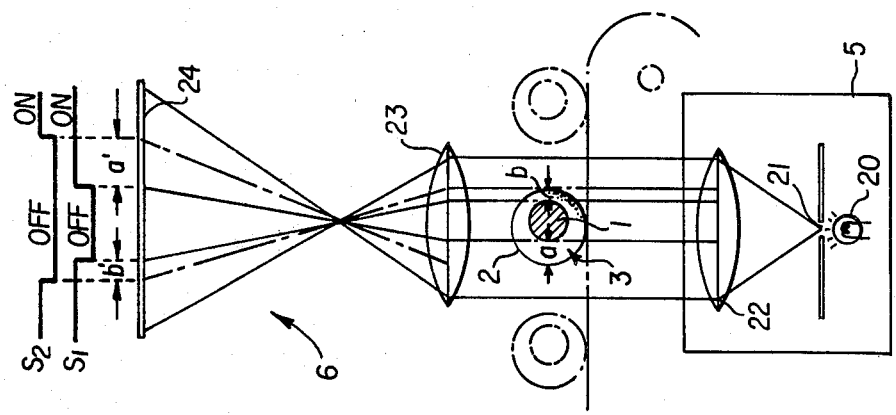
FIGS. 15 to 19 are diagrams showing examples of detectors employed in the present invention.

FIG. 15 shows an example of the detectors 9, 10 and 13, in which the light source 5 includes a halogen lamp 20 and a slit 21 located in front of the lamp to project through a lens 22 a parallel beam of light toward the photosensitive device 6.

The photosensitive device 6 includes a lens 23 and a line image sensor 24 receiving light through the lens 23, the respective light-receiving bits of the line image sensor 24 producing a signal "0" where the light from the light source 5 is intercepted and a signal "1" where the light is incident thereon.

Thus, signals $S_1$ or $S_2$, respectively indicative of the location and the width of the core wire 1 or flux 2, are obtained by scanning the line image sensor 24 by a known method.

Second Example of a Detector

Figure 16:
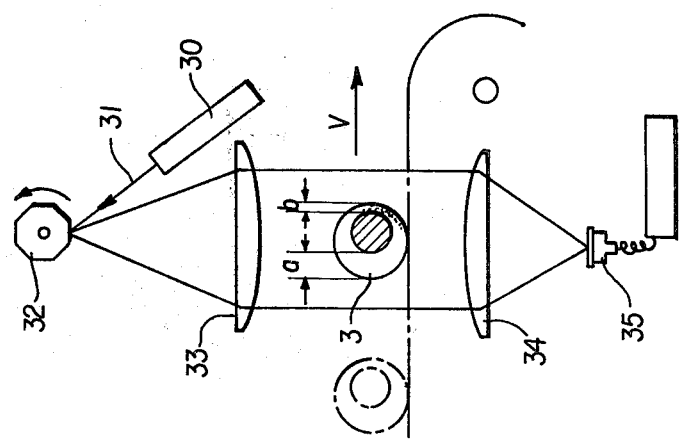

FIG. 16 shows an example using a laser 30 as a light source, deflecting a laser beam across the welding rod 3 on the conveyer 4 with the use of a rotary mirror 32 to project through a lens 33 a parallel beam for reception by a photo-multiplier 35 through a lens 34.

Third Example of a Detector

Figure 17:
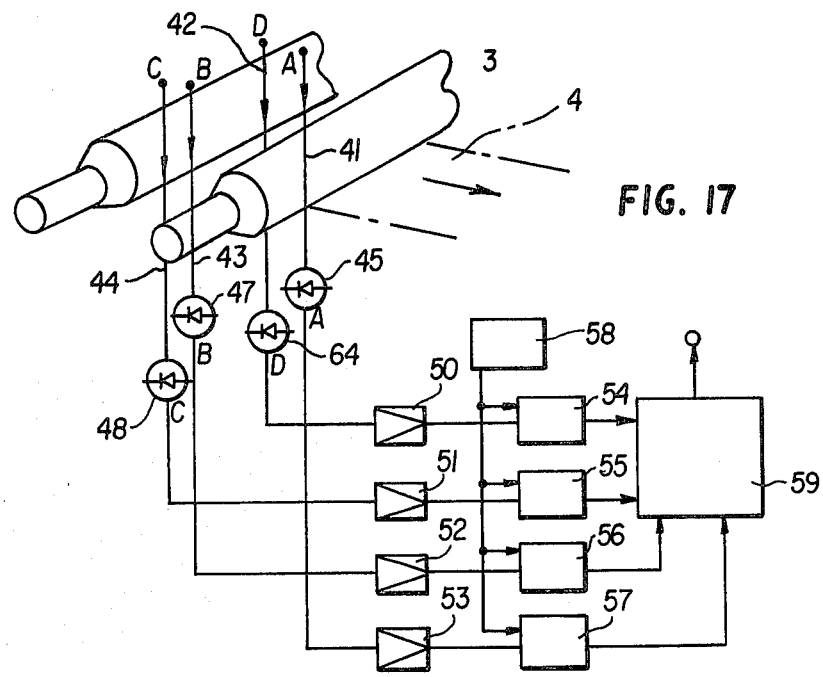

FIG. 17 illustrates an example of projecting four independent laser beams 41 to 44 at positions aligned in the axial direction of a normal welding rod while receiving the respective laser beams by photosensitive elements 45 to 48. The output signals of the photosensitive elements 45 to 48 are applied to counters 54 to 57 through amplifiers 50 to 53, respectively.

Figure 18:
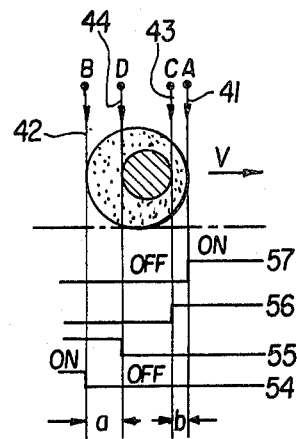

Each counter is supplied with clock signals 58 and is adapted to feed to a control circuit 59 a count of a period when, for example, the laser beam 41 is intercepted by a welding rod. Thus, the values a and b are calculated from the outputs of the counters 54 to 57 shown in FIG. 18.

The use of laser beams has the following advantages.
(1) Higher light intensity per unit area;
(2) High directivity (smaller angle of diversion) suitable for forming a highly collimated beam;
(3) Excellent monochromatic characteristics (uniform wavelength);
(4) Excellent time coherency (longer series of waves);
(5) Excellent spatial coherency (spatially uniform peak and root positions of waves).

Further, in the application of laser beams to the measurement of eccentricity of welding rods, it is possible to resort to a method using a modulation system. In such a method, a laser beam which is continuously projected from a generator tube is modulated into intermittent laser light through a modulation system of known construction. In this instance, the detectors may be of the construction as in the first embodiment.

The laser modulation system applied to the measurement of the welding rods performs functions similar to those of a strobescope as will be described.

Namely, a moving object is irradiated by an instantaneous flash of laser light to take its instantaneous still image, thereby measuring the dimensions of the object with high precision. The use of a laser is more advantageous than the strobescope since the latter has a limited service life (a limited number of flashes).

Fourth Example of a Detector

Figure 19:
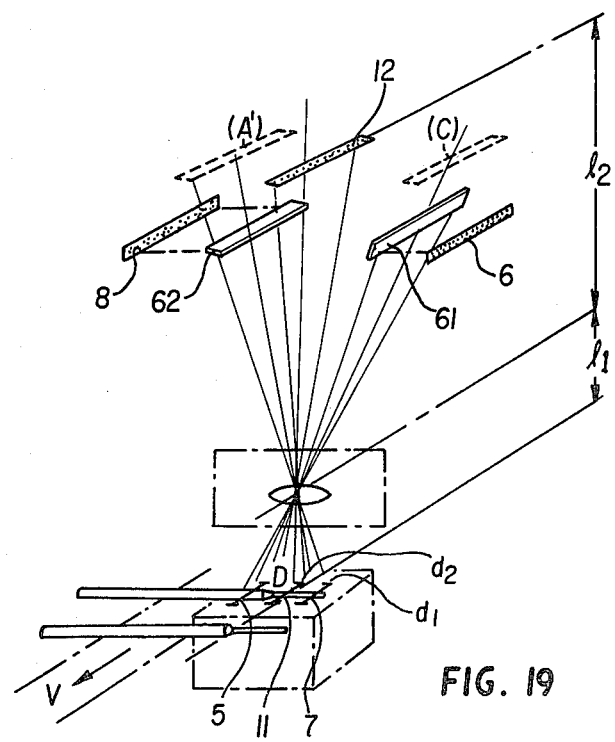

FIG. 19 illustrates an arrangement of the first to third detectors 9, 10 and 13, in which the light beams from the respective light sources 5, 7 and 11 are reflected on mirrors 61 and 62 toward line image sensors 6, 8 and 12, respectively.

Figure 23:
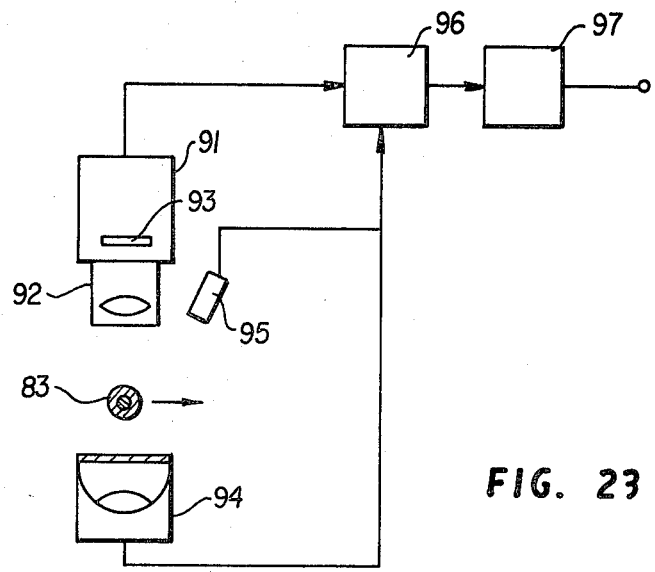
FIG. 23 is a block diagram of an essential part of the system of FIG. 19.

In this instance, each light source employs a stroboscope or strobe. FIG. 23 shows an arrangement of a detector employing a strobe, which is used for each of the detecting positions D, $d_1$ and $d_2$ shown in FIG. 19.

Referring to FIG. 23, denoted at 91 is a camera, at 92 a condenser, at 93 an image sensor located on the focal plane of the condenser 92, at 94 a stroboscope, at 95 a photoelectric trigger switch for the stroboscope 94, at 96 a scanning gate circuit for the image sensor 93, at 97 an arithmetic circuit, and at 3 a welding rod being transferred.

Now, as the moving welding rod 3 reaches a point between the camera 91 and the stroboscope 94, this is detected by the photoelectric switch 95 to flash the stroboscope for some $\mu$seconds. At this time, if the welding rod 3 is within the viewfield of the image sensor 93 during the duration of the flash, an electric charge commensurate with a product of the intensity of incident light and the incident time period is accumulated in each photodiode of the image sensor 93.

Upon extinction of the stroboscope 94, the gate 96 is opened to scan the array of photodiodes of the image sensor 93, taking out the signal electric charges by analog shift registers.

The numbers of the bright and dark signals from the image sensor 93 are counted and arithmetically processed through the arithmetic circuit 97 to calculate the dimeters at the grip and coated portions of the welding rod 3.

Figure 24:
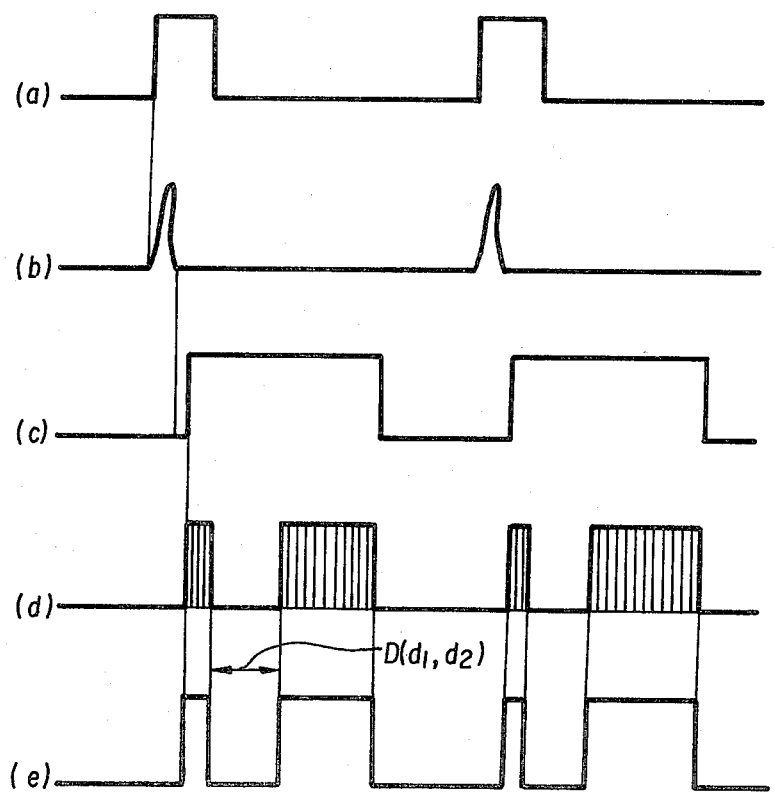
FIG. 24 is a diagram explanatory of the operations of FIG. 23.

FIG. 24 is an explanatory time chart of the above-described operation, in which line (a) indicates an object to be measured, (b) indicates illumination by the stroboscope, (c) the scanning time of the image sensor, (d) analog video, and (e) waveforms of the respective outputs after binarization processing.

Since the stroboscope produces flashes of high luminosity and short time period, the speed of sensitivity of the image sensor is improved to a considerable degree, allowing measurement at high speeds.

The stroboscope 94 is preferred to be provided with, for example, ground glass on the front side thereof to form a dispersive light source for uniformly illuminating the measuring range of the camera 91. Errors accruing from the magnification by the condenser can be minimized by providing a sufficient distance between the camera and the object to be measured.

In this manner, the use of strobe permits high precision measurement of the dimensions of moving objects, without involving the "bit drooping phenomenon".

Circuit Arrangement of Measuring System

Figure 20:
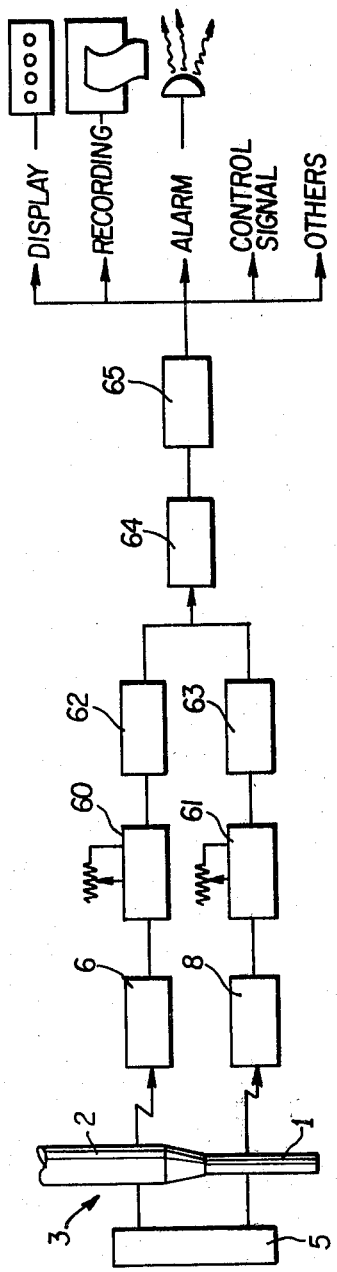
FIG. 20 is a circuit diagram of a control system for the embodiment using a pair of detectors.

FIG. 20 is a block diagram of a circuit arrangement in a measuring system employing a pair of detectors according to the invention, in which a light beam from a light source 5 is projected on line image sensors 6 and 8.

The output (hereinafter referred to as "bit output") of each photoelectric element of the image sensors 6 and 8 is converted into a binary signal of "0" or "1" by binarization circuits 60 and 61, respectively, according to whether or not the projected light is incident on the photoelectric element in question.

These signals of the line image sensors 6 and 8 are sequentially read out by bit number counters 62 and 63 and fed to a superposing circuit 64.

The function of the superposing circuit 64 is explained with reference to FIG. 5. The photosensitive device 6 has an output waveform as shown at line (a), so that the coating diameter D can be measured from $x_1-x_4$, the distance between the two cut off points in the output waveform, namely, the cut off point (1) (at bit number $x_1$) and the cut off point (4) (at bit number $x_4$).

On the other hand, the concurrent output of the photosensitive device 8 has a waveform as shown at line (b), from which the diameter d of the core wire is measured by calculating $x_2-x_3$ in the same manner.

The foregoing operations give the values of D and d but not of a and b.

Therefore, the following operation is performed to measure the value of a or b. Namely, for this purpose, the waveform of line (c) is obtained by aligning the concurrent output of the photosensitive devices 6 and 8 along the respective X- and Y-axes.

Thus, the values of a and b are obtained from $a-x_1-x_2$ and $b-x_3-x_4$, respectively. The signals corresponding to the bit positions (1) and (4) and bit positions (2) and (3) of FIG. 5 are taken out in the above-described manner, and applied to the arithmetic circuit 65 which performs the operations of (1)-(2) and (3)-(4) for the value of $|a-b|$, the difference in flux thickness around the core wire 1.

The output data of the arithmetic operator 65 is fed to display and recording means, and at the same time used for producing an alarm signal when the result of arithmetic operation falls out of a predetermined range or as a control signal for altering the degree of eccentricity of the core wire.

The foregoing operations are performed for each one of the welding rods which are transferred by the conveyer 4.

Figure 22:
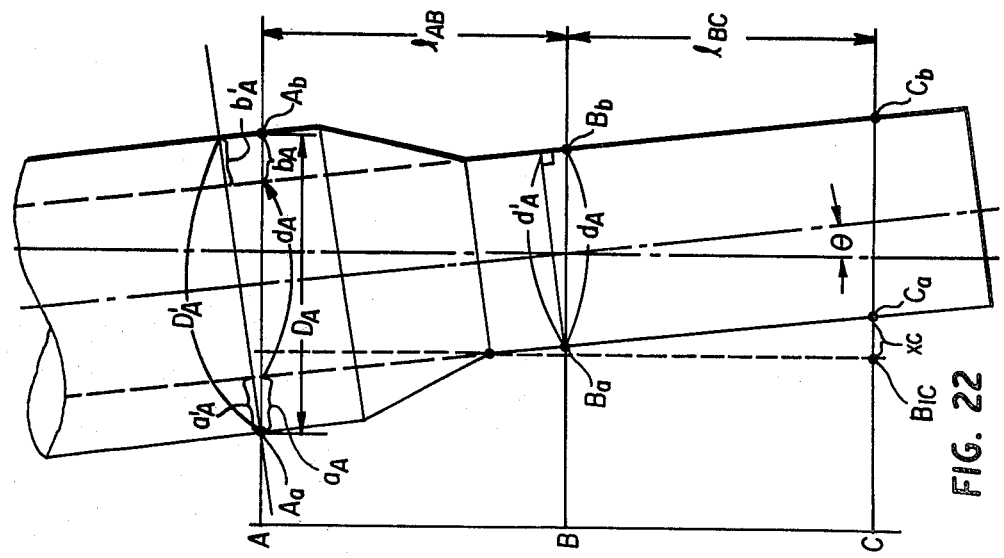
FIG. 22 is a diagram showing positional relations in a welding rod which are involved in the operation by the control system of FIG. 21.
Figure 21:
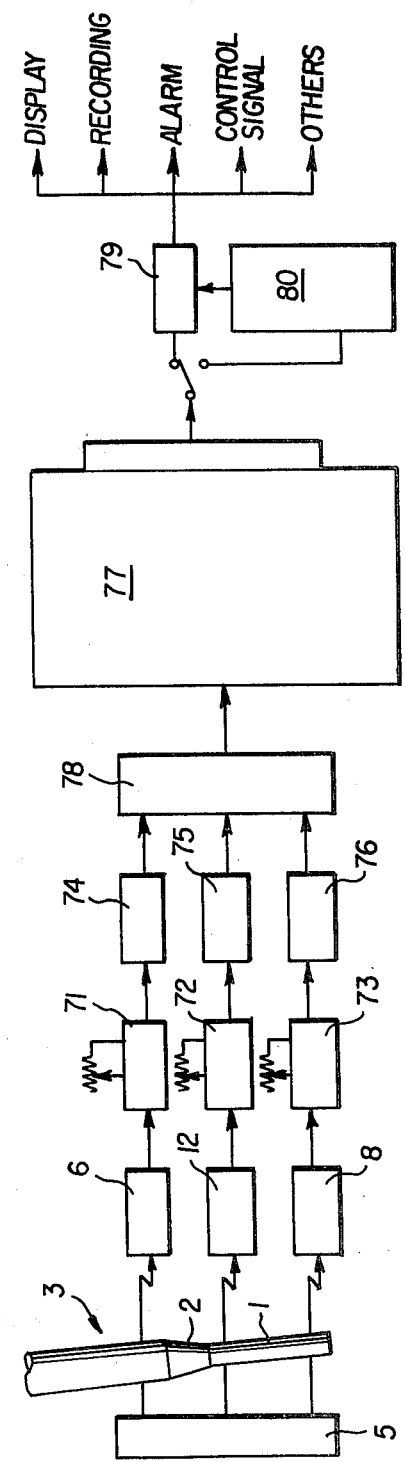
FIG. 21 is a circuit diagram of a control system for the embodiment using three detectors.

FIG. 21 is a block diagram of a measuring system employing three detectors, in which the outputs of the line image sensors 6, 8, 12 are converted into binary signals by binarization circuits 71, 72 and 73 and applied to bit number counters 74, 75 and 76, respectively. The bit number counter 74 counts the bit positions $A_a$ and $A_b$ of FIG. 10, the counter 76, the bit positions $B_a$ and $B_b$ of FIG. 10, the counter 75, the bit positions $C_a$ and $C_b$ of FIG. 10, respectively. The outputs of these counters 74 to 76 are applied to a superposing portion 78 which operates on the same principles as in FIG. 20, and the results are passed to a processor 77 which performs the following arithmetic operations.

$$X_C = (C_a - B_a) \quad \text{(See FIG. 22)}$$

-continued $$X_A = k \cdot X_C \quad \text{(See FIG. 22)} \quad k = \frac{lAB}{lBC}$$

$$a_A = \{B_a - (A_a + X_A)\}$$
$$b_A = \{A_b - (A_a + a_M + d_M)\}$$
$$d_A = (B_b - B_a) \text{ or } (C_b - C_a)$$

The results of the foregoing operations are fed to an operational circuit 79 which performs the operation of $a_A - b_A$ for the difference in flux thickness.

In a case where the welding rod under inspection has a large bend, the values of $a_A$ and $d_A$ may be corrected by a corrector 80 according to $a_A' = a_A \cos\theta$ and $d_A' = d_A \cos\theta$ (wherein $\theta \tan^{-1}(X_c)/lBC$ As clear from the foregoing detailed description, the present invention detects the opposite side edges of the flux and grip portions of each welding rod by the use of optical detectors thereby automatically detecting the eccentricity of the core wire or variations in flux thickness. This method is capable of inspecting the eccentricity at high speeds and therefore applicable to on-line inspection in the manufacturing process of welding rods, ensuring high-precision detection of eccentricity of core wires.

Moreover, the method of the present invention provides a non-destructive high-speed measuring operation which is suitable for total inspection of welding rods for strict quality control thereof.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for automatic, non-destructive measurement of eccentricity of a core wire located within a coating composition of a coated electrode by the use of optical means, comprising:

moving, in a direction substantially transverse to the axis thereof, at least one coated electrode having an exposed core wire portion;

providing at least two paired optical detecting means each having a light source for projecting a light beam toward a coated electrode on one side of the coated electrode and a signal generator located on the other side of said coated electrode to generate signals according to the intensity of incident light, positioning at least one of said detecting means to measure the diameter and location of said exposed portion of said core wire and positioning at least one of the remaining detecting means at a point spaced from said one of said detecting means in the axial direction of said wire to measure the diameter and location said coating of said coated electrode; and processing the signals from said signal generators by an arithmetic means to measure the eccentricity of said coated electrode.

2. An automatic, non-destructive measuring method as set forth in claim 1, wherein said coated electrode is measured while being transferred by a conveyer.

3. A measuring method as set forth in claim 1 or 2, wherein said coated electrode is measured a plural number of times while being rotated about the longitudinal axis thereof.

4. A measuring method as set forth in claims 1 or 2, wherein three pairs of said optical detecting means are provided, two of said pairs measuring said exposed portion of said core wire.

5. A measuring method as set forth in claims 1 or 2, wherein said electrode is irradiated by collimated rays having a width at least equal to width of said electrode.

6. A measuring method as set forth in claims 1 or 2, wherein said electrode is measured by a plural number of juxtaposed optical detecting means.

7. The measuring method of claim 6 wherein said juxtaposed optical detecting means are separated by 90° about the circumference of a portion of said electrode.

8. The measuring method of claim 5 wherein said collumated rays are produced by a laser.

* * * * *